A. GEERLINGS.
Wind-Mills.
No. 129,023.  Patented July 16, 1872.
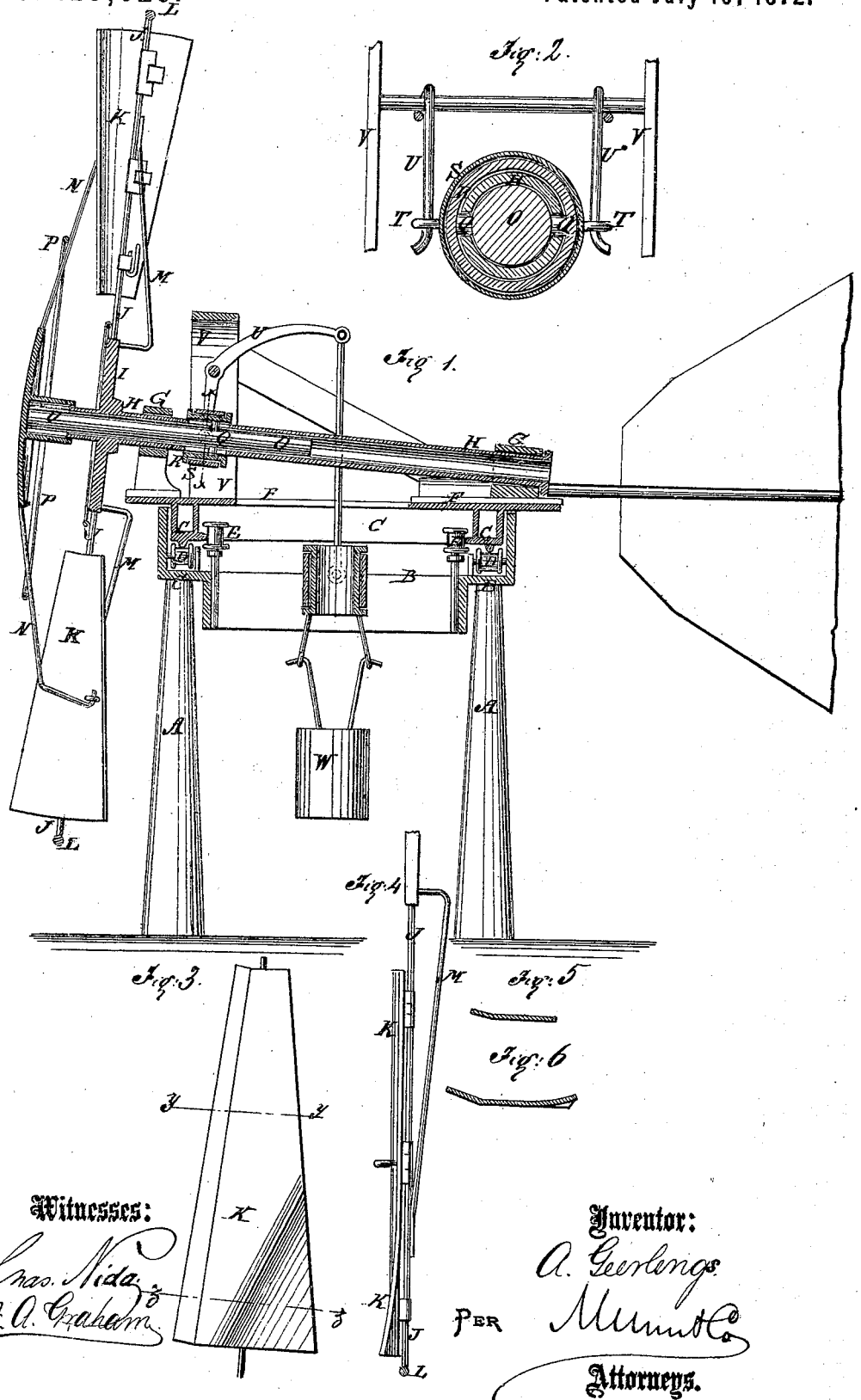

129,023

UNITED STATES PATENT OFFICE.

ARENT GEERLINGS, OF HOLLAND, MICHIGAN.

IMPROVEMENT IN WINDMILLS.

Specification forming part of Letters Patent No. 129,023, dated July 16, 1872.

Specification describing a new and useful Improvement in Windmill, invented by ARENT GEERLINGS, of Holland, in the county of Ottawa and State of Michigan.

In the accompanying drawing, Figure 1 is a detail vertical section of my improved windmill, illustrating its construction. Fig. 2 is a detail section of the same taken through the line $x\ x$, Fig. 1. Fig. 3 is a detail side view of one of the wings. Fig. 4 is an edge view of the same. Fig. 5 is a detail cross-section of the same taken through the line $y\ y$, Fig. 3. Fig. 6 is a detail cross-section of the same taken through the line $z\ z$, Fig. 3.

Similar letters of reference indicate corresponding parts.

My invention relates, first, to a new arrangement of devices for adjusting the wings automatically to take the breeze more or less, according to its force, so as to maintain a uniform rate of speed; and, secondly, to a new construction of the wings themselves, the same being bent forward at their forward edges and rear outer corners, to cause the wind to pass inward and be discharged at their rear inner corner, as hereinafter described.

A in the drawing represents the frame or tower to which the windmill is attached. To the top of the tower or frame A is secured a ring-plate, B, which is made with a downwardly-projecting flange upon its inner edge, and with an upwardly-projecting flange upon its outer edge. C is a rim fitting within the outer flange of the ring-plate B, and which is made with a rib upon its lower side to rest upon friction-rollers D connected with the ring-plate B. The rim C is also provided with a rib upon its inner or concave side, to rest against friction-rollers E connected with the ring-plate B. To the top of the rim C is attached a plate or platform, F, to support the operating parts of the mill, and which is made with an opening in its center for the passage of the vertical shaft by means of which the machinery is driven, and which is not shown in the drawing. To the plate or platform F are attached the bearings G for the shaft H. The shaft H is made hollow, and to its outer part is attached a disk or hub, I, to which are attached the inner ends of a series of radial rods, J, to which the wings K are hinged or pivoted, and the outer ends of which are connected with a ring, L, which thus connects the outer ends of all the radial rods J and holds them in their proper relative positions. The rods J are strengthened by brace-rods M, the outer ends of which are attached to the rods J toward their outer ends. The braces M extend inward and incline rearward, and at or near the outer edge of the disk or hub I are bent forward, and their ends are secured to the said disk I or the inner parts of the said rods J. The wings K are made in about the form shown in Figs. 1, 3, 4, 5, and 6—that is to say, their forward edges and the rear outer corners are bent forward so as to receive the wind, cause it to pass inward along said wings, and be discharged at the rear inner corner. To the forward side of the middle part of the wings K, near their rear edges, are pivoted the ends of the rods N, which project forward, are bent inward, and their inner ends are attached to the shaft O, or to a disk or hub attached to said shaft. The radial rods N may be further strengthened, secured in place, and connected together by a ring or rings, P. The shaft O fits into and revolves in the cavity of the hollow shaft H, as shown in Fig. 1. To the shaft O is attached a pin, Q, which passes through longitudinal slots in the hollow shaft H, and its ends are attached to a sleeve, R, fitting loosely upon the shaft H, so that the shaft O, shaft H, and sleeve R may all revolve together, and so that the shaft O may be moved longitudinally in the shaft H by means of the sleeve R in adjusting the wings to the wind. Upon the sleeve R is placed a sleeve, S, the ends of which rest against flanges formed upon the ends of the sleeve R. To the opposite sides of the sleeve S are attached eyes T to receive the ends of the forked or double lever U, which is pivoted to the supports V attached to the platform F. With the inner end of the lever U is connected a weight, W, which may be adjusted to hold the wings at any desired angle to the wind.

The tendency of the wind is to turn the wings' edge to the wind, which tendency is resisted by the action of the weight W, the tendency of which is to turn the wings to the wind, so that by adjusting the weight W the wings may be held to the wind with any desired force. By this construction, should the wind increase in force, it will overcome the resistance of the weight W, and adjust the wings automatically, so as to regulate the wind-wheel and cause it to revolve at all times with about the same velocity, however much the wind may vary in force. The pivoting-rod of the hinges that connect the wings K with the rods J should be secured in place by a nut, so that by detaching said rods the wings K may be slid inward a little, and thus detached.

Having thus described my invention, I claim as new and desire to secure by Letters Patent—

1. The wings K, made substantially of the form shown—that is to say, with their forward edges and rear outer corners bent forward—as specified.

2. The arrangement of the rods J, brace-rods M, and ring L, in connection with the wings K and disk or hub I of the hollow shaft H, substantially as herein shown and described, and for the purpose set forth.

3. The radial rods N, inner shaft O, pin Q, flanged sleeve R, stationary sleeve S, and weight and lever U W, constructed and arranged, in connection with the wings K and hollow shaft H, substantially as herein shown and described, and for the purpose set forth.

ARENT GEERLINGS.

Witnesses:
K. SCHADDELEE,
J. VAN LANDEGEND,
JOHN G. TER HAAN.